US009842590B2

(12) United States Patent
Warford et al.

(10) Patent No.: US 9,842,590 B2
(45) Date of Patent: *Dec. 12, 2017

(54) FACE-TO-FACE COMMUNICATION ANALYSIS VIA MONO-RECORDING SYSTEM AND METHODS

(71) Applicant: Mattersight Corporation, Chicago, IL (US)

(72) Inventors: Roger Warford, Hoschton, GA (US); Christopher Danson, Austin, TX (US); Jennifer Kuhn, Austin, TX (US)

(73) Assignee: MATTERSIGHT CORPORATION, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/389,780

(22) Filed: Dec. 23, 2016

(65) Prior Publication Data

US 2017/0110121 A1    Apr. 20, 2017

Related U.S. Application Data

(63) Continuation of application No. 15/046,635, filed on Feb. 18, 2016, now Pat. No. 9,538,008, which is a
(Continued)

(51) Int. Cl.
*G10L 15/18* (2013.01)
*G06Q 30/00* (2012.01)
(Continued)

(52) U.S. Cl.
CPC .............. *G10L 15/18* (2013.01); *G06Q 30/01* (2013.01); *G10L 17/06* (2013.01); *G10L 21/0272* (2013.01); *G10L 25/63* (2013.01)

(58) Field of Classification Search
CPC ...... G06Q 30/01; G10L 15/1822; G10L 15/26; G10L 21/0272; G10L 15/18; G10L 17/06;
(Continued)

(56) References Cited

U.S. PATENT DOCUMENTS 6,332,122 B1    12/2001   Ortega et al.
8,094,803 B2    1/2012    Danson et al.
(Continued)

FOREIGN PATENT DOCUMENTS

WO    WO 2013/000868 A1    1/2013
WO    WO 2014/107141 A1    7/2014

*Primary Examiner* — Harry S Hong
(74) *Attorney, Agent, or Firm* — Haynes and Boone, LLP

(57) ABSTRACT

The methods, apparatus, non-transitory computer readable media, and systems described herein include recording a mono recording of a face-to-face communication between an agent and a customer using a microphone, wherein the mono recording is unseparated and includes agent voice data and customer voice data, separately recording the agent voice data in an agent recording using a second microphone; aligning the unseparated mono recording and the agent recording so they are time-synched; subtracting agent voice data from the unseparated mono recording using the agent recording to provide a separated recording including only customer voice data, wherein the agent voice data is subtracted from the unseparated mono recording based on the alignment, sound frequency analysis, or both; converting at least the customer voice data to text; and determining a personality type of the customer by applying one or more computer-implemented linguistic algorithms to the text of the customer voice data.

31 Claims, 5 Drawing Sheets

FIG. 3

Related U.S. Application Data continuation of application No. 14/610,136, filed on Jan. 30, 2015, now Pat. No. 9,300,801.

(51) Int. Cl.
*G10L 25/63* (2013.01)
*G10L 21/0272* (2013.01)
*G10L 17/06* (2013.01)

(58) Field of Classification Search
CPC ..... G10L 25/63; G20L 25/48; H04L 12/1831; H04M 3/42221; H04M 3/5175
USPC ........................................ 379/265.01–265.09
See application file for complete search history.

(56) References Cited

U.S. PATENT DOCUMENTS

| | | |
|---|---|---|
| 8,135,115 B1 | 3/2012 | Hogg, Jr. et al. |
| 8,583,436 B2 | 11/2013 | Yamamoto et al. |
| 8,611,523 B2 | 12/2013 | Conway et al. |
| 9,300,801 B1 | 3/2016 | Warford et al. |
| 9,538,008 B2 * | 1/2017 | Warford ............. H04M 3/5175 |
| 2005/0259653 A1 | 11/2005 | Reuveni |
| 2006/0262920 A1 | 11/2006 | Conway |
| 2008/0240404 A1 | 10/2008 | Conway et al. |
| 2008/0240405 A1 | 10/2008 | Conway et al. |
| 2009/0103711 A1 | 4/2009 | Conway |
| 2014/0064473 A1 | 3/2014 | Conway et al. |
| 2014/0074471 A1 | 3/2014 | Sankar et al. |
| 2014/0249873 A1 | 9/2014 | Stephan et al. |
| 2016/0227036 A1 | 8/2016 | Warford et al. |

* cited by examiner

FACE-TO-FACE COMMUNICATION ANALYSIS VIA MONO-RECORDING SYSTEM AND METHODS

CROSS REFERENCE TO RELATED APPLICATIONS

This application is a continuation of U.S. patent application Ser. No. 15/046,635, filed Feb. 18, 2016, now allowed, which is a continuation of U.S. patent application Ser. No. 14/610,136, filed Jan. 30, 2015, now U.S. Pat. No. 9,300,801 B1, the entire contents of each which is hereby incorporated herein by express reference thereto.

TECHNICAL FIELD

The present disclosure generally relates to methods, apparatus, non-transitory computer readable media, and systems that separate sounds, and more specifically separate voice data of a customer from a mono recording of the customer and an agent based on a face-to-face communication.

BACKGROUND OF THE DISCLOSURE

Large organizations, such as commercial organizations, financial institutions, government agencies or public safety organizations conduct numerous interactions with customers, users, suppliers and the like on a daily basis. Many of these interactions are vocal, or at least comprise a vocal or audio component, for example, voices of parties to a phone call or the audio portion of a video or face-to-face interaction. A significant part of these interactions takes place between a customer and a representative of the organization, e.g., an agent in a contact center.

Contact centers typically do not record agent and customer portions of their calls in stereo or in separated channel audio, as telephone networks are typically mono. Without the separated data, it is not possible to quickly and/or accurately perform an analysis on the caller and/or agent. Accordingly, improved methods and systems are needed and are disclosed herein that effectively separate customer voice data from agent voice data so that the data can be separately analyzed.

SUMMARY

The present disclosure describes methods and systems that analyze separate voice data in customer/agent communications. In one aspect, the present disclose encompasses a system for analyzing a face-to-face customer-agent communication that includes a node comprising a processor and a non-transitory computer readable medium operably coupled thereto, the non-transitory computer readable medium comprising a plurality of instructions stored in association therewith that are accessible to, and executable by, the processor, wherein the plurality of instructions when executed: record a mono recording of a communication between an agent and a customer using a microphone, wherein the mono recording is unseparated and includes agent voice data and customer voice data, separately record the agent voice data in an agent recording using a second microphone; align the unseparated mono recording and the agent recording so they are time-synched; subtract agent voice data from the unseparated mono recording using the agent recording to provide a separated recording including only customer voice data, wherein the agent voice data is subtracted from the unseparated mono recording based on the alignment, sound frequency analysis, or both; convert at least the customer voice data to text; and determine a personality type of the customer by applying one or more computer-implemented linguistic algorithms to the text of the customer voice data.

In a second aspect, the disclosure relates to a method for analyzing a face-to-face customer-agent communication that includes recording a mono recording of a communication between an agent and a customer using a microphone, wherein the mono recording is unseparated and includes agent voice data and customer voice data; separately recording the agent voice data in an agent recording using a second microphone; aligning the unseparated mono recording and the agent recording so they are time-synched; subtracting agent voice data from the unseparated mono recording using the agent recording to provide a separated recording including only customer voice data, wherein the agent voice data is subtracted from the unseparated mono recording based on the alignment, sound frequency analysis, or both; converting at least the customer voice data to text; and determining a personality type of the customer by applying one or more computer-implemented linguistic algorithms to the text of the customer voice data.

In a third aspect, the disclosure relates to a non-transitory computer readable medium comprising a plurality of instructions, which in response to a computer system, cause the computer system to perform a method that includes recording a mono recording of a communication between an agent and a customer using a microphone, wherein the mono recording is unseparated and includes agent voice data and customer voice data; separately recording the agent voice data in an agent recording using a second microphone, aligning the unseparated mono recording and the agent recording so they are time-synched; subtracting agent voice data from the unseparated mono recording using the agent recording to provide a separated recording including only customer voice data, wherein the agent voice data is subtracted from the unseparated mono recording based on the alignment, sound frequency analysis, or both; converting at least the customer voice data to text; and determining a personality type of the customer by applying one or more computer-implemented linguistic algorithms to the text of the customer voice data.

In various embodiments applicable at least to the aspects above, the system, methods, and apparatus herein further apply voice printing to the customer voice data to facilitate identification of the customer, or instructions that, when executed, do the same. In another embodiment, the voice printing identifies the customer. In yet another embodiment, the agent is associated with one or more commercial organizations, financial institutions, government agencies or public safety organizations.

In a fourth aspect, the disclosure relates to a system for analyzing a customer-agent communication, including a node including a processor and a non-transitory computer readable medium operably coupled thereto, the non-transitory computer readable medium including a plurality of instructions stored in association therewith that are accessible to, and executable by, the processor, wherein the plurality of instructions that, when executed, record a mono recording of a communication between an agent and a customer, wherein the mono recording is unseparated and includes agent voice data and customer voice data; separately record the agent voice data in an agent recording; align the unseparated mono recording and the agent recording so they are time-synched; subtract agent voice data from the mono recording using the agent recording to provide a separated recording including only customer voice data, wherein the agent voice data is subtracted from the unseparated mono recording based on the alignment, sound frequency analysis, or both; and apply distress analysis to a portion of the communication to identify one or more distress events.

In a fifth aspect, the disclosure relates to a methods for analyzing a customer-agent communications, which includes recording, by one or more processors, customer voice data and agent voice data in a communication between an agent and a customer as an unseparated mono recording; separately and concurrently recording, by one or more processors, the agent voice data in an agent recording; subtracting, by one or more processors, the agent voice data from the mono recording based on the agent recording and creating a separated customer recording including only customer voice data, wherein the agent voice data is subtracted from the unseparated mono recording based on alignment of the unseparated mono recording and the agent recording, sound frequency analysis, or both; and applying distress analysis to a portion of the communication to identify one or more distress events.

In a sixth aspect, the disclosure relates to a non-transitory computer readable medium including a plurality of instructions, which in response to a computer system, cause the computer system to perform a method including recording a customer-agent communication between an agent and a customer as a mono recording, wherein the mono recording is unseparated and includes the agent voice and the customer voice; separately recording an agent voice in an agent recording; converting the mono recording to text; converting the agent recording to text; subtracting the text of the agent recording from the text of the mono recording so that only text of the customer voice remains, wherein the agent voice data is subtracted from the unseparated mono recording based on alignment of the unseparated mono recording and the agent recording, sound frequency analysis, or both; and applying distress analysis to a portion of the communication to identify one or more distress events.

In one embodiment applicable at least to these above aspects, the system further include instructions that, when executed, convert the mono recording to text. In a preferred embodiment, the system further includes instructions that, when executed, convert the agent recording to text. In a preferred embodiment, the system further includes instructions that, when executed, subtract the text of the agent recording from the text of the mono recording. In yet another preferred embodiment, the system further includes applying a computer implemented linguistic algorithm to the text of the agent recording or the text of the separated customer recording. In a further preferred embodiment, the system further includes instructions that, when executed, evaluate the agent, provide training to the agent, or both, based on the distress events identified in the communication.

In another embodiment, the system further includes a computer implemented non-linguistic distress analytic tool applied to the separated recording. In another embodiment, the system further includes applying a computer-implemented linguistic distress analytic tool to the text. In yet another embodiment, the system further includes instructions that, when executed, generate and display on an agent device actionable tasks for the agent based on the identified distress events. In a preferred embodiment, the actionable tasks include specific words or actions. In another embodiment, the system further includes determining a personality type of the customer based on the computer-implemented linguistic algorithm applied to the text of the separated recording including only customer voice data. In yet a further embodiment, the system further includes determining a personality type of the agent based on the computer-implemented linguistic algorithm applied to the text of the agent recording.

In another set of embodiments, the present methods evaluate customer voice data to determine personality type of the customer. The customer personality type can then be used to facilitate improved customer interactions.

In one such aspect, the present disclosure relates to a system for analyzing a customer communication. The system includes a node that includes a processor and a non-transitory computer readable medium operably coupled thereto, and the non-transitory computer readable medium includes a plurality of instructions stored in association therewith that are accessible to, and executable by, the processor. The plurality of instructions, when executed, record a mono recording of a communication between an agent and a customer, wherein the mono recording includes agent voice data and customer voice data; separately record the agent voice data in an agent recording; subtract agent voice data from the mono recording using the agent recording to provide a separated recording including only customer voice data; convert at least the customer voice data to text; and determine a personality type of the customer by applying one or more computer-implemented linguistic algorithms to the text of the customer voice data.

In a second such aspect, the present disclosure relates to a method for analyzing customer communications. The method includes recording, by one or more processors, customer voice data and agent voice data in a communication between a customer and an agent as a mono recording; separately and concurrently recording, by one or more processors, the agent voice data in an agent recording; subtracting, by one or more processors, the agent voice data from the mono recording based on the agent recording and creating a separated customer recording including only customer voice data; converting, by one or more processors, the customer voice data to text; and performing, by one or more processors, linguistic analysis on the text of the customer voice data to determine a personality type of the customer.

In a third such aspect, the present disclosure relates to a non-transitory computer readable medium that includes a plurality of instructions, which in response to a computer system, cause the computer system to perform a method. The method includes recording a customer communication between an agent and a customer as a mono recording, wherein the mono recording includes the agent voice and the customer voice; separately recording an agent voice in an agent recording; converting the mono recording to text; converting the agent recording to text; subtracting the text of the agent recording from the text of the mono recording so that only text of a customer voice remains; and applying a computer-implemented linguistic algorithm to the text of the customer voice to determine a personality type of the customer.

In another aspect, the disclosure encompasses a system for analyzing a customer communication that includes a node including a processor and a non-transitory computer readable medium operably coupled thereto, the non-transitory computer readable medium including a plurality of instructions stored in association therewith that are accessible to, and executable by, the processor, wherein the plurality of instructions when executed: record a mono recording of a communication between an agent and a customer, wherein the mono recording includes agent voice data and customer voice data; subtract agent voice data from the mono recording using the agent recording to provide a separated recording including only customer voice data; convert at least the customer voice data to text; and determine a personality type of the customer by applying one or more computer-implemented linguistic algorithms to the text of the customer voice data. Methods of analyzing customer/agent communications are also encompassed, such as by recording a mono recording of a communication between an agent and a customer, wherein the mono recording includes agent voice data and customer voice data, analyzing the recording to identify agent voice data and customer voice data in the recording, subtracting agent voice data from the mono recording using the identified agent voice data to provide a separated recording including only customer voice data; converting at least the customer voice data to text; and determining a personality type of the customer by applying one or more computer-implemented linguistic algorithms to the text of the customer voice data. Various preferred embodiments disclosed herein are applicable to each of the above-noted aspects of the present disclosure.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION OF THE PREFERRED EMBODIMENTS

Figure 1:
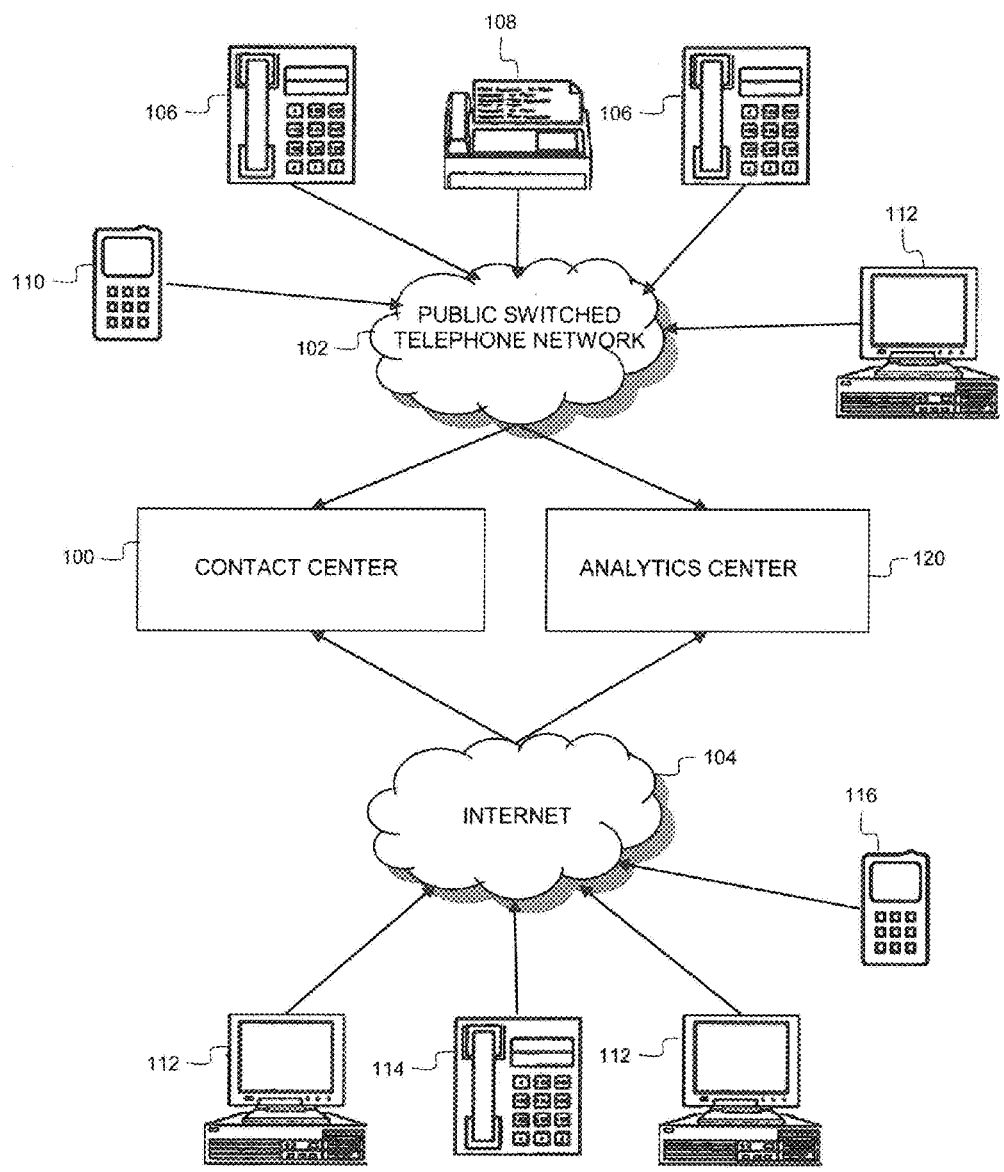
FIG. 1 is a block diagram of an embodiment of a system for analyzing a customer communication according to various aspects of the present disclosure.

The present disclosure advantageously describes methods and systems that separate customer and agent voice data in a communication so that one or both can be analyzed. Speaker separation can provide valuable context for the content of customer interactions. Analysis of the separate voice data can yield useful information related to customer satisfaction, agent performance, and business opportunities. In several embodiments, analysis of the words spoken by the customer provides the personality type of the customer, which can be used to guide an agent in the communication or even route or transfer a customer call to a complementary agent able to handle (or best able to handle) the communication with customers of that personality type.

The methods disclosed herein include recording a customer-agent communication as a mono recording; separately recording a voice of an agent in an agent mono recording; subtracting agent mono voice data from the customer-agent mono recording so that only customer voice data remains (either in the mono recording or in a newly created separated recording); converting the customer voice data to text; and performing linguistic analysis on the text of the customer voice data to determine a personality type of the customer. In other embodiments, no separating occurs and the systems and methods are configured to analyze two single channel audio streams to isolate agent and customer audio data.

Systems and apparatuses for carrying out these methods are also part of the present disclosure. An exemplary system to analyze a customer-agent communication includes, for example, a node including a processor and a computer readable medium operably coupled thereto, the computer readable medium including a plurality of instructions stored in association therewith that are accessible to, and executable by, the processor. In one embodiment, when executed, the plurality of instructions records a mono recording of a communication between an agent and a customer and includes agent voice data and customer voice data, separately records the agent voice data in an agent recording, subtracts agent voice data from the mono recording to provide a separated recording including only customer voice data (again, either on the mono recording or on a new, separated recording), convert at least the customer voice data to text, and determine a personality type of the customer by applying one or more computer-implemented linguistic algorithms to the text of the customer voice data. In various embodiments, the agent recording is an agent mono recording including agent mono voice data.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one of ordinary skill in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a simplified block diagram of an embodiment of a contact center 100 according to various aspects of the present disclosure. A "contact center" as used herein can include any facility or system server suitable for receiving and recording electronic communications from customers. Such customer-agent communications can include, for example, telephone calls, video interactions, facsimile transmissions, e-mails, web interactions, and voice over IP ("VoIP"). Various specific types of communications contemplated through one or more of these channels include, without limitation, email, SMS data (e.g., text), tweet, instant message, web-form submission, smartphone app, social media data, and web content data (including but not limited to internet survey data, blog data, microblog data, discussion forum data, and chat data), etc. In some embodiments, the communications can include customer tasks, such as taking an order, making a sale, responding to a complaint, etc. It is contemplated that these communications may be transmitted by and through any type of telecommunication device and over any medium suitable for carrying such data. For example, the communications may be transmitted by or through telephone lines, cable, or wireless communications (e.g., satellite, Wi-Fi, bluetooth, cellular phone network, etc.). As shown in FIG. 1, the contact center 100 of the present disclosure is adapted to receive and record varying electronic communications and data formats that represent an interaction that may occur between a customer (or caller) and a contact center agent during fulfillment of a customer and agent transaction. In one embodiment, the contact center 100 records all of the customer contacts in uncompressed audio formats. In the illustrated embodiment, customers may communicate with agents associated with the contact center 100 via multiple different communication networks, such as a public switched telephone network (PSTN) 102 or the Internet 104, e.g., including via Skype®, Facetime®, Tango™, or any other communication app, program, website, or other software or hardware. For example, a customer may initiate an interaction session through traditional telephones 106, a fax machine 108, a cellular (i.e., mobile) telephone 110 (e.g., such as a smartphone with video capabilities), a personal computing device 112 with a modem, or other legacy communication device via the PSTN 102. Further, the contact center 100 may accept internet-based interaction sessions from personal computing devices 112, VoIP telephones 114, and internet-enabled smartphones 116 and personal digital assistants (PDAs).

As one of ordinary skill in the art would recognize, the illustrated example of communication channels associated with a contact center 100 in FIG. 1 is just an example, and the contact center may accept customer interactions, and other analyzed interaction information from an analytics center, through various additional and/or different devices and communication channels whether or not expressly described herein.

For example, in some embodiments, internet-based interactions, video-based interactions and/or telephone-based interactions may be routed through an analytics center 120 before reaching the contact center 100 or may be routed simultaneously to the contact center and the analytics center (or even directly and only to the contact center). In some instances, the analytics center 120 is a third-party analytics company that captures interaction data associated with the contact center 100 and applies computer-implemented linguistic algorithms to the data to generate personality type data for the contact center. For example, the analytics center 120 may provide an analysis of customer and/or agent voice data according to the present disclosure, receive a customer-agent communication, separate agent voice data from customer voice data, determine personality type of a customer, etc. The analytics center 120 may be controlled by the same entity or a different entity than the contact center 100. Further, the analytics center 120 may be a part of, or independent of, the contact center 100.

Figure 2:
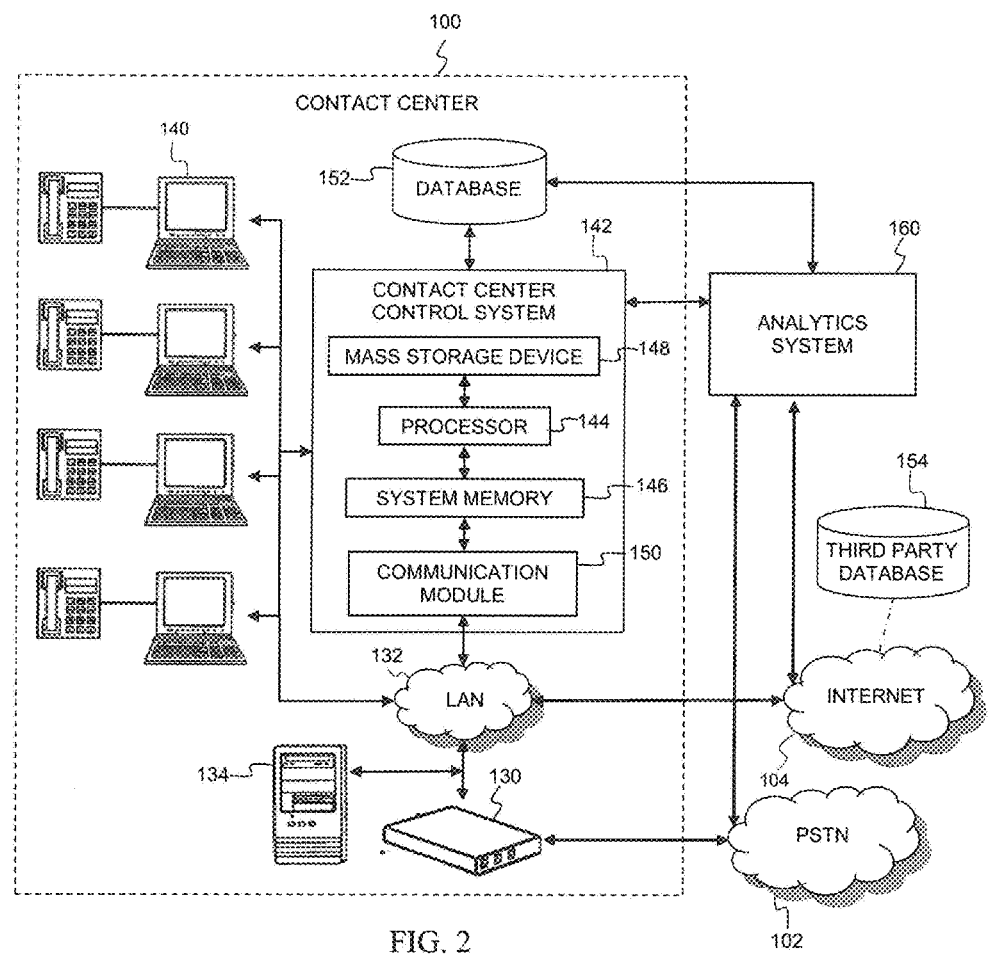
FIG. 2 is a detailed block diagram of the contact center of FIG. 1 according to aspects of the present disclosure.

FIG. 2 is a more detailed block diagram of an embodiment of the contact center 100 according to aspects of the present disclosure. As shown in FIG. 2, the contact center 100 is communicatively coupled to the PSTN 102 via a distributed private branch exchange (PBX) switch 130. The PBX switch 130 provides an interface between the PSTN 102 and a local area network (LAN) 132 within the contact center 100. In general, the PBX switch 130 connects trunk and line station interfaces of the PSTN 102 to components communicatively coupled to the LAN 132. The PBX switch 130 may be implemented with hardware or virtually. A hardware-based PBX may be implemented in equipment located local to the user of the PBX system. In contrast, a virtual PBX may be implemented in equipment located at a central telephone service provider that delivers PBX functionality as a service over the PSTN 102. Additionally, in one embodiment, the PBX switch 130 may be controlled by software stored on a telephony server 134 coupled to the PBX switch. In another embodiment, the PBX switch 130 may be integrated within telephony server 134. The telephony server 134 incorporates PBX control software to control the initiation and termination of connections between telephones within the contact center 100 and outside trunk connections to the PSTN 102. In addition, the software may monitor the status of all telephone stations coupled to the LAN 132 and may be capable of responding to telephony events to provide traditional telephone service. In certain embodiments, this may include the control and generation of the conventional signaling tones including without limitation dial tones, busy tones, ring back tones, as well as the connection and termination of media streams between telephones on the LAN 132. Further, the PBX control software may programmatically implement standard PBX functions such as the initiation and termination of telephone calls, either across the network or to outside trunk lines, the ability to put calls on hold, to transfer, park and pick up calls, to conference multiple callers, and to provide caller ID information. Telephony applications such as voice mail and auto attendant may be implemented by application software using the PBX as a network telephony services provider.

In one embodiment, the telephony server 134 includes a trunk interface that utilizes conventional telephony trunk transmission supervision and signaling protocols required to interface with the outside trunk circuits from the PSTN 102. The trunk lines carry various types of telephony signals such as transmission supervision and signaling, audio, fax, or modem data to provide plain old telephone service (POTS). In addition, the trunk lines may carry other communication formats such T1, ISDN or fiber service to provide telephony or multi-channel data images, video, text or audio.

The telephony server 134 includes hardware and software components to interface with the LAN 132 of the contact center 100. In one embodiment, the LAN 132 may utilize IP telephony, which integrates audio stream control with legacy telephony functions and may be supported through the H.323 protocol. H.323 is an International Telecommunication Union (ITU) telecommunications protocol that defines a standard for providing voice services over data networks. H.323 permits users to make point-to-point audio phone calls over a local area network. IP telephony systems can be integrated with the public telephone system through an IP/PBX-PSTN gateway, thereby allowing a user to place telephone calls from an enabled computer. For example, a call from an IP telephony client within the contact center 100 to a conventional telephone outside of the contact center would be routed via the LAN 132 to the IP/PBX-PSTN gateway. The IP/PBX-PSTN gateway would then translate the H.323 protocol to conventional telephone protocol and route the call over the PSTN 102 to its destination. Conversely, an incoming call from a customer over the PSTN 102 may be routed to the IP/PBX-PSTN gateway, which translates the conventional telephone protocol to H.323 protocol so that it may be routed to a VoIP-enable phone or computer within the contact center 100.

The contact center 100 is further communicatively coupled to the Internet 104 via hardware and software components within the LAN 132. One of ordinary skill in the art would recognize that the LAN 132 and the connections between the contact center 100 and external networks such as the PSTN 102 and the Internet 104 as illustrated by FIG. 2 have been simplified for the sake of clarity and the contact center may include various additional and/or different software and hardware networking components such as routers, switches, gateways, network bridges, hubs, and legacy telephony equipment. It should be understood that the entire arrangement between customer and agent at the analytics center can be conducted via VoIP, or VoIP connected to traditional telephony, all in accordance with various aspects of the present disclosure. In various embodiments, the customer interactions that occur at the contact center 100 include video interactions with a voice component including, but not limited to video conferences, Skype® sessions, and FaceTime® calls.

As shown in FIG. 2, the contact center 100 includes a plurality of agent workstations 140 that enable agents employed by the contact center 100 to engage in customer interactions over a plurality of communication channels. In one embodiment, each agent workstation 140 may include at least a telephone and a computer workstation. In other embodiments, each agent workstation 140 may include a computer workstation that provides both computing and telephony functionality. Through the workstations 140, the agents may engage in telephone conversations with the customer, respond to email inquiries, receive faxes, engage in instant message conversations, respond to website-based inquires, video chat with a customer, and otherwise participate in various customer interaction sessions across one or more channels. Further, in some embodiments, the agent workstations 140 may be remotely located from the contact center 100, for example, in another city, state, or country. Alternatively, in some embodiments, an agent may be a software-based application configured to interact in some manner with a customer. An exemplary software-based application as an agent is an online chat program designed to interpret customer inquiries and respond with pre-programmed answers.

The contact center 100 further includes a contact center control system 142 that is generally configured to provide recording, voice analysis, behavioral analysis, storage, and other processing functionality to the contact center. In the illustrated embodiment, the contact center control system 142 is an information handling system such as a computer, server, workstation, mainframe computer, or other suitable computing device. In other embodiments, the control system 142 may be a plurality of communicatively coupled computing devices coordinated to provide the above functionality for the contact center 100. The control system 142 includes a processor 144 that is communicatively coupled to a system memory 146, a mass storage device 148, and a communication module 150. The processor 144 can be any custom made or commercially available processor, a central processing unit (CPU), an auxiliary processor among several processors associated with the control system 142, a semiconductor-based microprocessor (in the form of a microchip or chip set), a macroprocessor, a collection of communicatively coupled processors, or any device for executing software instructions. The system memory 146 provides the processor 144 with non-transitory, computer-readable storage to facilitate execution of computer instructions by the processor. Examples of system memory may include random access memory (RAM) devices such as dynamic RAM (DRAM), synchronous DRAM (SDRAM), solid state memory devices, and/or a variety of other memory devices known in the art. Computer programs, instructions, and data may be stored on the mass storage device 148. Examples of mass storage devices may include hard discs, optical disks, magneto-optical discs, solid-state storage devices, tape drives, CD-ROM drives, and/or a variety other mass storage devices known in the art. Further, the mass storage device may be implemented across one or more network-based storage systems, such as a storage area network (SAN). The communication module 150 is operable to receive and transmit contact center-related data between local and remote networked systems and communicate information such as customer interaction recordings between the other components coupled to the LAN 132. Examples of communication modules may include Ethernet cards, 802.11 WiFi devices, cellular data radios, and/or other suitable devices known in the art. The contact center control system 142 may further include any number of additional components, which are omitted for simplicity, such as input and/or output (I/O) devices (or peripherals), buses, dedicated graphics controllers, storage controllers, buffers (caches), and drivers. Further, functionality described in association with the control system 142 may be implemented in software (e.g., computer instructions), hardware (e.g., discrete logic circuits, application specific integrated circuit (ASIC) gates, programmable gate arrays, field programmable gate arrays (FPGAs), etc.), or a combination of hardware and software.

According to one aspect of the present disclosure, the contact center control system 142 is configured to record, collect, and analyze customer voice and other structured and unstructured data, and other tools may be used in association therewith to increase efficiency and efficacy of the contact center. As an aspect of this, the control system 142 is operable to record unstructured interactions between customers and agents occurring over different communication channels including without limitation telephone conversations, email exchanges, website postings, social media communications, smartphone application (i.e., app) communications, fax messages, instant message conversations, etc. For example, the control system 142 may include a hardware or software-based recording server to capture the audio of a standard or VoIP telephone connection established between an agent workstation 140 and an outside customer telephone system. Further, the audio from an unstructured telephone call may be transcribed manually or automatically and stored in association with the original audio. In one embodiment, multiple communication channels (i.e., multi-channel) may be used according to the invention, either in real-time to collect information, for evaluation, or both. For example, control system 142 can receive, evaluate, and store telephone calls, emails, and fax messages. Thus, multi-channel can refer to multiple channels of interaction data, or analysis using two or more channels.

In addition to unstructured interaction data such as interaction transcriptions, the control system 142 is configured to captured structured data related to customers, agents, and their interactions. For example, in one embodiment, a "cradle-to-grave" recording may be used to record all information related to a particular call or contact from the time the contact enters the contact center to the later of: the customer terminating contact or the agent completing the transaction. All or a portion of the interactions during the call or other contact may be recorded, including interaction with an interactive voice response (IVR) system, time spent on hold, data keyed through the caller's key pad, conversations with the agent, and screens displayed by the agent at his/her station during the transaction. Additionally, structured data associated with interactions with specific customers may be collected and associated with each customer, including without limitation the number and length of contacts placed to the contact center, contact origination information, reasons for interactions, outcome of interactions, average hold time, agent actions during interactions with customer, manager escalations during customer contact, types of social media interactions, number of distress events during interactions, survey results, and other interaction information. In addition to collecting interaction data associated with a customer, the control system 142 is also operable to collect biographical profile information specific to a customer including without limitation customer phone number or email address, account/policy numbers, address, employment status, income, gender, race, age, education, nationality, ethnicity, marital status, credit score, customer "value" data (i.e., customer tenure, money spent as customer, etc.), personality type (e.g., as determined by past interactions), and other relevant customer identification and biological information. The control system 142 may also collect agent-specific unstructured and structured data including without limitation agent personality type, gender, language skills, performance data (e.g., customer retention rate, etc.), tenure and salary data, training level, average hold time during interactions, manager escalations, agent workstation utilization, and any other agent data relevant to contact center performance. Additionally, one of ordinary skill in the art would recognize that the types of data collected by the contact center control system 142 that are identified above are simply examples and additional and/or different interaction data, customer data, agent data, and telephony data may be collected and processed by the control system 142.

The control system 142 may store recorded and collected interaction data in a database 152, including customer data and agent data. In certain embodiments, agent data, such as agent scores for dealing with customers, are updated daily. The database 152 may be any type of reliable storage solution such as a RAID-based storage server, an array of hard disks, a storage area network of interconnected storage devices, an array of tape drives, or some other scalable storage solution located either within the contact center or remotely located (i.e., in the cloud). Further, in other embodiments, the contact center control system 142 may have access not only to data collected within the contact center 100 but also data made available by external sources such as a third party database 154. In certain embodiments, the control system 142 may query the third party database for customer data such as credit reports, past transaction data, and other structured and unstructured data.

In some embodiments, an analytics system 160 may also perform some or all of the functionality ascribed to the contact center control system 142 above. For instance, the analytics system 160 may record telephone and internet-based interactions, as well as perform behavioral analyses, predict customer personalities or customer profiles, retrieve pre-existing customer profiles, and perform other contact center-related computing tasks, as well as combinations thereof. The analytics system 160 may be integrated into the contact center control system 142 as a hardware or software module and share its computing resources 144, 146, 148, and 150, or it may be a separate computing system housed, for example, in the analytics center 120 shown in FIG. 1. In the latter case, the analytics system 160 includes its own processor and non-transitory computer-readable storage medium (e.g., system memory, hard drive, etc.) on which to store predictive analytics software and other software instructions.

The interaction data collected from one channel or multi-channels in the context of the control center 100 may be subject to a linguistic-based psychological behavioral model to assess the personality of customers and agents associated with the interactions. For example, such a behavioral model may be applied to the transcription of a telephone call between a customer and agent to gain insight into why a specific outcome resulted from the interaction.

In one embodiment, a voice analysis module in contact center control system 142 mines interaction data for behavioral signifiers associated with a linguistic-based psychological behavioral model. In particular, the voice analysis module searches for and identifies text-based keywords (i.e., behavioral signifiers) relevant to a predetermined psychological behavioral model. In a preferred embodiment, multi-channels are mined for such behavioral signifiers.

It is well known that certain psychological behavioral models have been developed as tools, and any such behavioral model available to those of ordinary skill in the art will be suitable for use in connection with the disclosure. These models are used to attempt to evaluate and understand how and/or why one person or a group of people interacts with another person or group of people. One example is the Big Five inventory model (©2000) by UC Berkeley psychologist Oliver D. John, Ph.D. Another is the Process Communication Model™ developed by Dr. Taibi Kahler. Exemplary personality types, which will vary from model to model and can be selected as desired for a given application or across all applications, might include, for example: Thoughts, Opinions, Reactions, Emotions. These models generally presuppose that all people fall primarily into one of the enumerated basic personality types. In some cases, the models categorize each person as one of these four types (or some other number of personality types), all people have parts of each of the types within them. Each of the types may learn differently, may be motivated differently, may communicate differently, and may have a different sequence of negative behaviors in which they engage under certain circumstances, e.g., when they are in distress. Importantly, each personality type may respond positively or negatively to communications that include tones or messages commonly associated with another of the personality types. Thus, an understanding of a user's personality type typically offers guidance as to how the user will react or respond to different situations.

Linguistic algorithms can be applied to the text of the communication and yield a personality type. A linguistic algorithm(s) is typically created by linguistic analysts and such algorithm(s) are typically trained using previously analyzed customer-agent communications. In one embodiment, the analyst(s) can review communications and manually label keywords or terms that are relevant to an identified personality type. The computer-implemented algorithm is trained to check for those keywords and the number of times they are used in the communications. A more sophisticated algorithm may be used that additionally checks for use of the keywords in context. One master algorithm containing many specific algorithms may also be used.

In addition to determining personality type from the interaction data, the control system 142 may also or alternatively apply distress analysis techniques to the interaction data to detect distress events. For example, when applied to a telephone-based interaction session, linguistic-based distress analysis may be conducted on both a textual translation of voice data and an audio file containing voice data. Accordingly, linguistic-based analytic tools as well as non-linguistic analytic tools may be applied to the audio file. In particular, the control system 142 may apply spectral analysis to the audio file voice data while applying a human speech/linguistic analytical tool to the text file. Linguistic-based analysis and computer-implemented algorithms for identifying distress can be applied to the textual translation of the communication. Resultant distress data may be stored in the database 152 or elsewhere for subsequent analysis of the communication. Distress event data and other linguistic-based analytic data may be considered behavioral assessment data in some instances. Further, in other embodiments, the control system 142 may be operable to apply voice printing techniques to the unstructured audio from various customer interactions. For example, a recorded sample may be utilized to identify, or facilitate identification of, a customer in the event the customer did not supply any identifying information.

Figure 3:
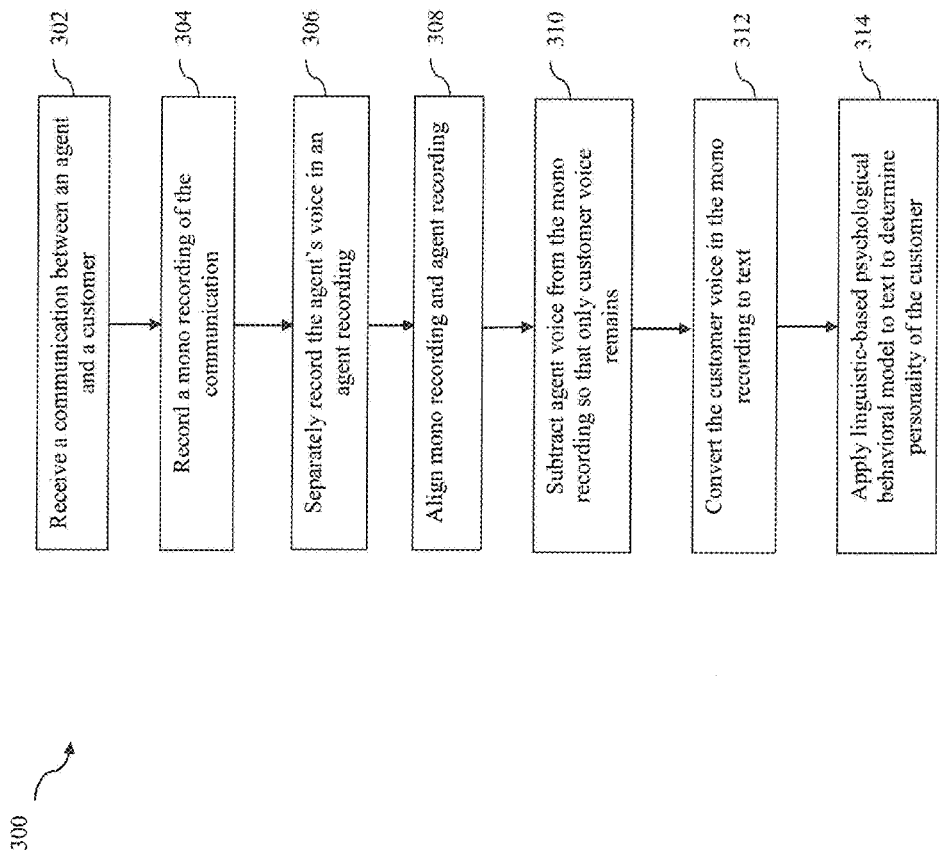
FIG. 3 is a flowchart illustrating a preferred method of analyzing a customer communication according to aspects of the present disclosure.

An exemplary method 300 of analyzing a customer-agent communication according to the disclosure will now be described with respect to FIG. 3. At step 302, the contact center control system 142 receives a communication between an agent and a customer. In various embodiments, the communication is received from the contact center 100, but in other embodiments, the communication may be received from a user device. The communication may be received in any form of electronic communication, including text based (email, text, web interaction) or recorded verbal (telephonic) responses or video based responses. The communication may be stored for later use.

At step 304, the contact center control system 142 receives and records a mono recording of the communication that includes both the customer and agent voices. By "mono" is meant particularly that separate channels are not used to record the agent and the customer sides of the communication. A mono recording is a recording that is done on one single channel. In a mono recording, a single audio stream can contain the two sides of the call or interaction.

At step 306, in an optional but preferred embodiment, the control system 142 separately but concurrently records only the agent's voice in the communication. In various embodiments, the agent recording is also a mono recording.

At step 308, the control system 142 aligns the mono recording and the agent recording so that they are synchronized or matched. For example, the mono recording and agent recording can be time-synched, matched by sound analysis, or both. Another exemplary method to align different recordings is the cross-correlation of audio segments. This approach can, for example, take two audio files at a given point in time and compare the amplitude of the audio samples and calculate the error rate of subtracting the two samples, or one sample from the other. If the files were both agent only, the "error rate" would be zero since the two signals would perfectly match at that point in time. Thus, the process of this example can iteratively compare the two files until a minimal error rate exists across time. In the specific case of comparing the mono file with the agent file, the error rates will not be zero across the whole audio file (since the customer is mixed in at points in time), but the minimal error rate at points or along the audio timeline will still result in maximum alignment of the two files. Thus, this is a the preferred method for alignment of two audio files.

At step 310, the control system 142 subtracts or removes the agent side or agent voice of the communication from the mono recording so that only the customer side or customer voice of the communication remains on the mono recording. In another embodiment, the agent voice data is removed from the mono recording by recording, copying, or otherwise transferring only the customer voice data or customer side of the communication to a separated recording. Generally, the separated recording is the mono recording without the agent voice data.

In certain embodiments, the agent's side is removed from the mono recording by sound frequency analysis. For example, the agent recording can be analyzed to determine the sound frequencies present in the recording. The agent's voice may have a frequency (or range of frequencies) different from the customer's voice so that the agent's voice can be identified and removed by removing certain frequencies from the mono recording or certain time segments where those frequencies exist (or where only those frequencies exist, which would potentially retain segments where both agent and customer voices are present). In some embodiments, other characteristics of the agent voice such as pitch, tone, volume, or vibration may be determined from the agent recording and used to remove the agent voice from the mono recording. In one exemplary embodiment, the approached used is essentially a speaker separation technique, with the speaker model being "seeded" by a voice print generated from the agent only audio (e.g., agent acoustic model). Thus, in this approach, an acoustic model of the agent's voice is generated from the agent-only file or a separate agent-only recording. One or more segments of the mono file are then analyzed by comparing the segment to the acoustic model, and finding the segments that closely match the acoustic model generated as well as segments that are distant, or different from, the generated acoustic model of the agent. The two types of segments are characterized as agent or customer accordingly (based on how near to, or far from, the model, respectively). The segments of the audio that are typed as agent (or score nearest to agent acoustic model based on a threshold) can then be sliced out, or otherwise eliminated, and the remaining file is primarily the customer-only recording. This separated file can be further analyzed for customer personality trait or other customer analysis.

At step 312, the control system 142 converts the customer side of the mono recording (or the separated recording, not shown) to text. At step 314, the control system 142 applies at least one linguistic-based psychological behavioral model or computer-implemented algorithm to the text to determine personality type of the customer. The algorithm, for example, looks for specific terms, keywords and phrases (i.e., groups of keywords) that indicate a specific personality type and the density of those terms in the text.

In various embodiments, these terms, phrases, or keywords are stored in a library or libraries that are accessed by the control system 142. The library may separate the keywords, terms, and phrases into different personality types. Keywords are the words previously determined to indicate the specific characteristic in the input. Each keyword may have respective aliases, which are essentially synonyms of keywords. Synonyms of the keywords may be identified and also stored in the library. The aliases are typically treated as interchangeable with the keywords from a scoring perspective, but in one embodiment aliases can be treated as not interchangeable if specific words, terms, or phrases are expected to be used. Also, due to the flexibility of the methods described herein, additional words, terms, and/or phrases may be added to the library at any time, such as based on additional input, external analysis of terminology, or both. For example, when it becomes apparent that another word is used frequently and is just as effective as the associated keyword, the library may be updated to include this word as an acceptable alias. In other embodiments, contextual weighting based on keywords used in context with certain related words may be used, to help determine personality type when a keyword is used by multiple personality types.

The control system 142, in one embodiment, uses one or more computer-implemented linguistic algorithms that are configured to detect keywords, terms, and phrases in the text related to personality type, and the text can be scored based on the number of word hits (i.e., based on keywords, terms, phrases, etc.). When a score is assigned to the text it can be associated with and identify the personality type of the customer. For example, reactions-type personalities use emotional words, opinions-types use opinion words, emotions-types use reflection words, and reactions-types use reaction words.

The personality type of the customer can then be used to improve the quality of future customer interactions with agents and ultimately customer relationships, beginning immediately on that interaction for real-time analysis of personality-type and other input discussed herein, or later on future calls by storing that information in association with a customer identifier. For example, the personality type of the customer may be used to distribute customer tasks or communications to the best available agent on duty based on personality type, provide certain words and phrases to an agent to use with the customer, determine services needs by the customer, predict customer behavior, and generate actionable agent tasks for the customer.

In various embodiments, the agent recording is also converted to text and the agent's personality type is determined. The personality type of the agent can be used to determine the best training methods for the agent, customers that should be matched with the agent, and measure agent performance.

Figure 4:
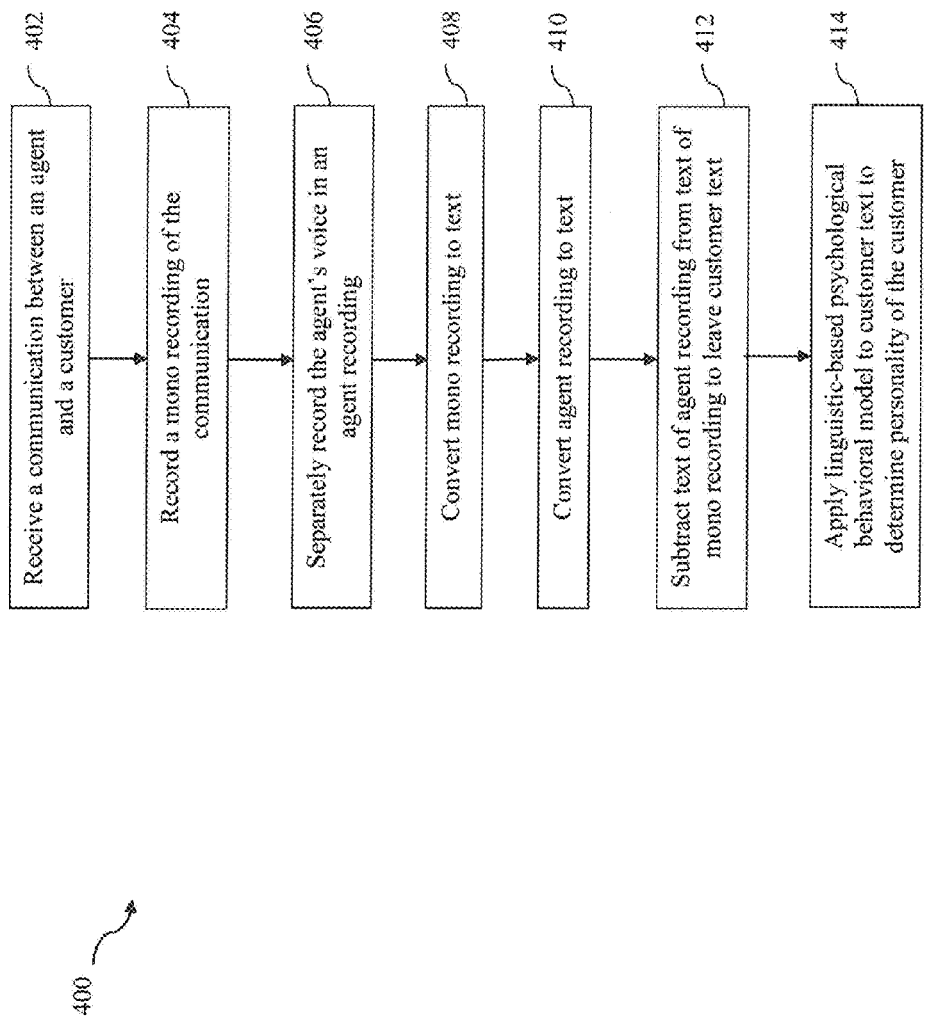
FIG. 4 is a flowchart illustrating another preferred method of analyzing a customer communication according to aspects of the present disclosure.

Another exemplary method 400 of analyzing a customer-agent communication according to the disclosure will now be described with respect to FIG. 4. Steps 402-406 are identical to steps 302-306 described above.

At step 408, the control system 142 converts the mono recording of the customer and agent voices to text. Each word includes a time notation of when the word was spoken. For example, a word may have a time range associated with it, such as an hour and minute range, a minute and second range, or an hour, minute, and second range, depending on the duration of an interaction and the frequency with which the different parties to the interaction talk.

At step 410, the control system 142 converts the agent recording to text. Each word also includes a time notation of when the word was spoken. When referring to the "word", it should be understood that multiple words can be spoken at a time, so reference to a word being spoken can include a phrase, sentence, paragraph, a speech, etc.

At step 412, based on the time notation, the control system 142 subtracts text of the agent recording from the text of the mono recording, leaving the customer's word(s).

At step 414, the control system 142 applies at least one linguistic-based psychological behavioral model or computer-implemented algorithm to the customer text of the communication to determine personality type of the customer. This step is analogous to step 314 above.

In another exemplary method, a customer-agent communication is analyzed using only the mono recording of the agent and customer voices. In this embodiment, agent and customer voices are recorded during the communication, but the agent tracks or notes the times when he or she is speaking (e.g., by pushing an on/off button to open a microphone and/or to designate when he or she is talking) so that these portions can be more easily tracked and subtracted or removed from the mono recording (or to generate a separated recording with just the customer voice data more easily). For example, the mono recording can be converted to text, and the on/off portions can be marked in the text and removed.

Figure 5:
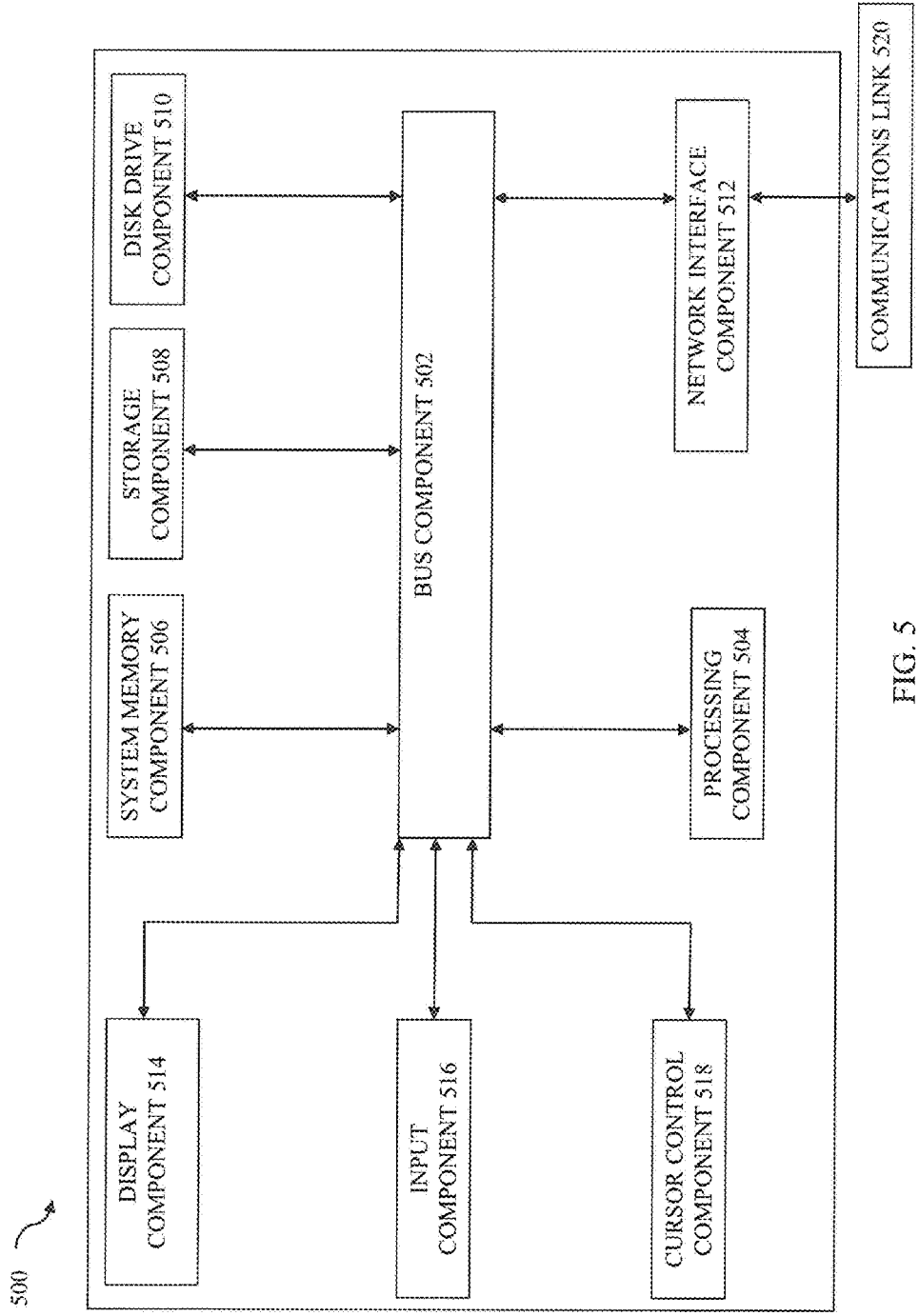
FIG. 5 is a block diagram of a computer system suitable for implementing one or more components in FIG. 1 according to an embodiment of the present disclosure.

Referring now to FIG. 5, illustrated is a block diagram of a system 500 suitable for implementing embodiments of the present disclosure, including contact center control system 142 and analytics system 160. System 500, such as part a computer and/or a network server, includes a bus 502 or other communication mechanism for communicating information, which interconnects subsystems and components, including one or more of a processing component 504 (e.g., processor, micro-controller, digital signal processor (DSP), etc.), a system memory component 506 (e.g., RAM), a static storage component 508 (e.g., ROM), a network interface component 512, a display component 514 (or alternatively, an interface to an external display), an input component 516 (e.g., keypad or keyboard), and a cursor control component 518 (e.g., a mouse pad).

In accordance with embodiments of the present disclosure, system 500 performs specific operations by processor 504 executing one or more sequences of one or more instructions contained in system memory component 506. Such instructions may be read into system memory component 506 from another computer readable medium, such as static storage component 508. These may include instructions to receive a customer-agent communication, separate agent and customer voice data, convert the customer voice data to text, determine personality type of the customer and/or agent, etc. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 504 for execution. Such a medium may take many forms, including but not limited to, non-volatile media, volatile media, and transmission media. In various implementations, volatile media includes dynamic memory, such as system memory component 506, and transmission media includes coaxial cables, copper wire, and fiber optics, including wires that comprise bus 502. Memory may be used to store visual representations of the different options for searching or auto-synchronizing. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 500. In various other embodiments, a plurality of systems 500 coupled by communication link 520 (e.g., networks 102 or 104 of FIG. 1, LAN, WLAN, PTSN, or various other wired or wireless networks) may perform instruction sequences to practice the disclosure in coordination with one another. Computer system 500 may transmit and receive messages, data, information and instructions, including one or more programs (i.e., application code) through communication link 520 and communication interface 512. Received program code may be executed by processor 504 as received and/or stored in disk drive component 510 or some other non-volatile storage component for execution.

In view of the present disclosure, it will be appreciated that various methods, apparatuses, computer readable media, and systems have been described according to one or more embodiments for analyzing a customer-agent communication.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to allow a quick determination of the nature of the technical disclosure. It is submitted with the understanding that it will not be used to interpret or limit the scope or meaning of the claims.

What is claimed is:

1. A system for analyzing a face-to-face customer-agent communication, comprising:
   a node comprising a processor and a non-transitory computer readable medium operably coupled thereto, the non-transitory computer readable medium comprising a plurality of instructions stored in association therewith that are accessible to, and executable by, the processor, wherein the plurality of instructions when executed:
   record a mono recording of a communication between an agent and a customer using a microphone, wherein the mono recording is unseparated and includes agent voice data and customer voice data;
   separately record the agent voice data in an agent recording using a second microphone;
   align the unseparated mono recording and the agent recording so they are time-synched;
   subtract agent voice data from the unseparated mono recording using the agent recording to provide a separated recording including only customer voice data, wherein the agent voice data is subtracted from the unseparated mono recording based on the alignment, sound frequency analysis, or both;
   convert at least the customer voice data to text; and
   determine a personality type of the customer by applying one or more computer-implemented linguistic algorithms to the text of the customer voice data.

2. The system of claim 1, which further comprises instructions that, when executed, apply voice printing to the customer voice data to facilitate identification of the customer.

3. The system of claim 2, wherein the voice printing identifies the customer.

4. The system of claim 1, wherein the agent is associated with one or more commercial organizations, financial institutions, government agencies or public safety organizations.

5. The system of claim 1, which further comprises instructions that, when executed, convert the agent recording to text.

6. The system of claim 5, which further comprises instructions that, when executed, apply a computer-implemented linguistic algorithm to the text of the agent recording.

7. The system of claim 1, which further comprises a computer implemented non-linguistic distress analytic tool applied to the separated recording.

8. The system of claim 5, which further comprises instructions that, when executed, evaluate the agent, provide training to the agent, or both, based on a plurality of distress events identified in the communication.

9. The system of claim 1, which further comprises instructions that, when executed, generate and display on an agent device one or more actionable tasks for the agent based on the personality type of the customer.

10. The system of claim 9, wherein the actionable tasks comprise specific words or actions.

11. The system of claim 5, which further comprises determining a personality type of the agent based on the computer-implemented linguistic algorithm applied to the text of the agent recording.

12. A method for analyzing a face-to-face customer-agent communication, which comprises:
   recording, by one or more processors, a mono recording of a communication between an agent and a customer using a microphone, wherein the mono recording is unseparated and includes agent voice data and customer voice data;
   separately recording, by one or more processors, the agent voice data in an agent recording using a second microphone;
   aligning, by one or more processors, the unseparated mono recording and the agent recording so they are time-synched;
   subtracting, by one or more processors, agent voice data from the unseparated mono recording using the agent recording to provide a separated recording including only customer voice data, wherein the agent voice data is subtracted from the unseparated mono recording based on the alignment, sound frequency analysis, or both;

converting at least the customer voice data to text; and determining, by one or more processors, a personality type of the customer by applying one or more computer-implemented linguistic algorithms to the text of the customer voice data.

13. The method of claim 12, which further comprises applying voice printing to the customer voice data to facilitate identification of the customer.

14. The method of claim 13, which further comprises identifying the customer based on the voice printing.

15. The method of claim 12, wherein the agent is associated with one or more commercial organizations, financial institutions, government agencies or public safety organizations.

16. The method of claim 12, which further comprises instructions that, when executed, convert the agent recording to text.

17. The method of claim 12, which further comprises applying a computer-implemented linguistic algorithm to the text of the agent recording.

18. The method of claim 12, which further comprises applying a computer implemented non-linguistic distress analytic tool applied to the separated recording.

19. The method of claim 16, which further comprises evaluating the agent, providing training to the agent, or both, based on a plurality of distress events identified in the communication.

20. The method of claim 12, which further comprises generating and displaying on an agent device one or more actionable tasks for the agent based on the personality type of the customer.

21. The method of claim 20, wherein the one or more actionable tasks are selected to comprise specific words or actions.

22. A non-transitory computer readable medium comprising a plurality of instructions, which in response to a computer system, cause the computer system to perform a method comprising:

recording a mono recording of a communication between an agent and a customer using a microphone, wherein the mono recording is unseparated and includes agent voice data and customer voice data;

separately recording the agent voice data in an agent recording using a second microphone;

aligning the unseparated mono recording and the agent recording so they are time-synched;

subtracting agent voice data from the unseparated mono recording using the agent recording to provide a separated recording including only customer voice data, wherein the agent voice data is subtracted from the unseparated mono recording based on the alignment, sound frequency analysis, or both;

converting at least the customer voice data to text; and determining a personality type of the customer by applying one or more computer-implemented linguistic algorithms to the text of the customer voice data.

23. The non-transitory computer readable medium of claim 22, which further comprises applying voice printing to the customer voice data to facilitate identification of the customer.

24. The non-transitory computer readable medium of claim 23, which further comprises identifying the customer based on the voice printing.

25. The non-transitory computer readable medium of claim 22, wherein the agent is associated with one or more commercial organizations, financial institutions, government agencies or public safety organizations.

26. The non-transitory computer readable medium of claim 22, which further comprises instructions that, when executed, convert the agent recording to text.

27. The non-transitory computer readable medium of claim 22, which further comprises applying a computer-implemented linguistic algorithm to the text of the agent recording.

28. The non-transitory computer readable medium of claim 22, which further comprises applying a computer implemented non-linguistic distress analytic tool applied to the separated recording.

29. The non-transitory computer readable medium of claim 26, which further comprises evaluating the agent, providing training to the agent, or both, based on a plurality of distress events identified in the communication.

30. The non-transitory computer readable medium of claim 22, which further comprises generating and displaying on an agent device one or more actionable tasks for the agent based on the personality type of the customer.

31. The non-transitory computer readable medium of claim 30, wherein the one or more actionable tasks are selected to comprise specific words or actions.

* * * * *